United States Patent
Gabrys (10) Patent No.: US 6,703,735 B1
(45) Date of Patent: Mar. 9, 2004

(54) ACTIVE MAGNETIC THRUST BEARING

(75) Inventor: Christopher W. Gabrys, Reno, NV (US)

(73) Assignee: Indigo Energy, Inc., Napa, CA (US)

( * ) Notice: Subject to any disclaimer, the term of this patent is extended or adjusted under 35 U.S.C. 154(b) by 0 days.

(21) Appl. No.: 10/053,150

(22) Filed: Nov. 2, 2001

(51) Int. Cl.$^7$ .................................................. H02K 7/09
(52) U.S. Cl. .......................... 310/90.5; 310/181; 310/90
(58) Field of Search ........................ 310/181, 90.5, 310/67 R, 254, 261

(56) References Cited

U.S. PATENT DOCUMENTS

| | | | |
|---|---|---|---|
| 3,860,300 A | | 1/1975 | Lyman |
| 3,865,442 A | | 2/1975 | Studer |
| 3,890,019 A | | 6/1975 | Boden et al. |
| 3,976,339 A | * | 8/1976 | Sabnis ........................ 310/90.5 |
| 4,300,807 A | * | 11/1981 | Poubeau .................... 310/90.5 |
| 4,634,191 A | * | 1/1987 | Studer ........................ 310/90.5 |
| 4,847,581 A | * | 7/1989 | Mohler ........................ 335/229 |
| 4,918,345 A | | 4/1990 | Vaillant de Guelis et al. |
| 5,216,308 A | * | 6/1993 | Meeks ........................ 310/90.5 |
| 5,250,865 A | * | 10/1993 | Meeks ........................ 310/90.5 |
| 5,315,197 A | * | 5/1994 | Meeks et al. ............... 310/90.5 |
| 5,406,157 A | * | 4/1995 | New ........................... 310/90.5 |
| 5,514,924 A | * | 5/1996 | McMullen et al. ......... 310/90.5 |
| 5,525,849 A | * | 6/1996 | Ito et al. .................... 310/90.5 |
| 5,550,413 A | * | 8/1996 | Bernus et al. ................ 310/36 |
| 5,625,240 A | * | 4/1997 | Bernus ...................... 310/90.5 |
| 5,736,800 A | * | 4/1998 | Iannello et al. ............ 310/90.5 |
| 5,920,138 A | * | 7/1999 | Clifton et al. ............. 310/90.5 |
| 6,034,456 A | * | 3/2000 | Osama et al. .............. 310/90.5 |
| 6,121,704 A | * | 9/2000 | Fukuyama et al. ........ 310/90.5 |
| 6,201,329 B1 | * | 3/2001 | Chen .......................... 310/90.5 |
| 6,213,737 B1 | * | 4/2001 | Murakami et al. ....... 417/423.4 |
| 6,313,555 B1 | * | 11/2001 | Blumenstock et al. ...... 310/90.5 |
| 6,447,266 B2 | * | 9/2002 | Antaki et al. ................ 417/356 |
| 6,570,286 B1 | * | 5/2003 | Gabrys ....................... 310/90.5 |
| 6,611,078 B1 | * | 8/2003 | Durham et al. ............. 310/254 |
| 2001/0030471 A1 | * | 10/2001 | Kanebako ..................... 310/12 |
| 2002/0175578 A1 | * | 11/2002 | McMullen et al. ......... 310/90.5 |

FOREIGN PATENT DOCUMENTS

| | | | | |
|---|---|---|---|---|
| JP | 02164265 | * | 6/1990 | .......... H02K/41/06 |
| JP | 0355124 | * | 12/1998 | ............ H02K/7/09 |
| JP | 2000184655 | * | 6/2000 | ............ H02K/7/09 |
| WO | WO 95/05700 | * | 3/1994 | ............ H02K/7/09 |

* cited by examiner

Primary Examiner—Dang Le
Assistant Examiner—Heba Y. Elkassabgi
(74) Attorney, Agent, or Firm—J. Michael Neary (57) ABSTRACT

An active magnetic thrust bearing, acting on only a single axial side of a rotor, while also having an efficient permanent magnet bias for linearized and highly amplified control, uses two concentric ring poles that axially face a ferromagnetic axial surface of the rotor, creating two annular axial air gaps. A permanent magnet in the stator drives a bias flux through a first path including two radially spaced concentric ring poles and their air gaps, and an annular region of the rotor axially aligned between the two ring poles. The permanent magnet also drives flux through a second high-reluctance flux path in the stator, by-passing the rotor. An electromagnetic coil in the stator drives a control flux in a circuit including the second path, both ring poles and axial air gaps, and the shunt. The bias and control fluxes are therefore superposed in the axial air gaps for amplified response.

16 Claims, 12 Drawing Sheets

ACTIVE MAGNETIC THRUST BEARING

This invention pertains to active magnetic thrust bearings and more particularly an active magnetic thrust bearing that acts in cooperation with only a single axial side of a rotor, using an efficient permanent magnet bias for linearized and highly amplified control. Compared with prior art active magnetic thrust bearings that use permanent magnet bias on two or more axial surfaces, the invention offers greatly simplified construction and assembly and reduced costs.

BACKGROUND OF THE INVENTION

Existing designs of active magnetic thrust bearings have suffered from problems including nonlinear control, inefficient force generation, and complex construction with actuation on two or more axial surf of a rotor. Many designs that use efficient force generation from permanent magnet bias, use one Or more thrust disks attached to the rotating object, and a stator that must be assembled to enclose a disk or to be enclosed by multiple disks. This type of construction is undesirable because it requires high tolerances on multiple piece assemblies, is expensive in terms of the multiple precision pieces and their assembly and because of the difficulties in assembly and disassembly of the rotor and bearing system It would be preferable to have an active magnetic thrust bearing that could operate on a single axial side of the rotor, facilitating much simpler and lower cost construction A prior art single sided active magnetic thrust bearing 30 using an unbiased electromagnet, shown in FIG. 1, includes a rotor or thrust disk 32 attached to a shaft 31, and a stator 39 constructed of a ferromagnetic yoke 33 located adjacent to the disk 32. The yoke 33 has an electromagnetic coil 34 and two ring poles 35 and 36 that form an axial air gap 37 between the stator yoke 33 and the thrust disk 32. Current through the electromagnetic coil 34 produces a controllable magnetic flux 38 that attracts the thrust disk 32 toward the stator 33.

Figure 1:
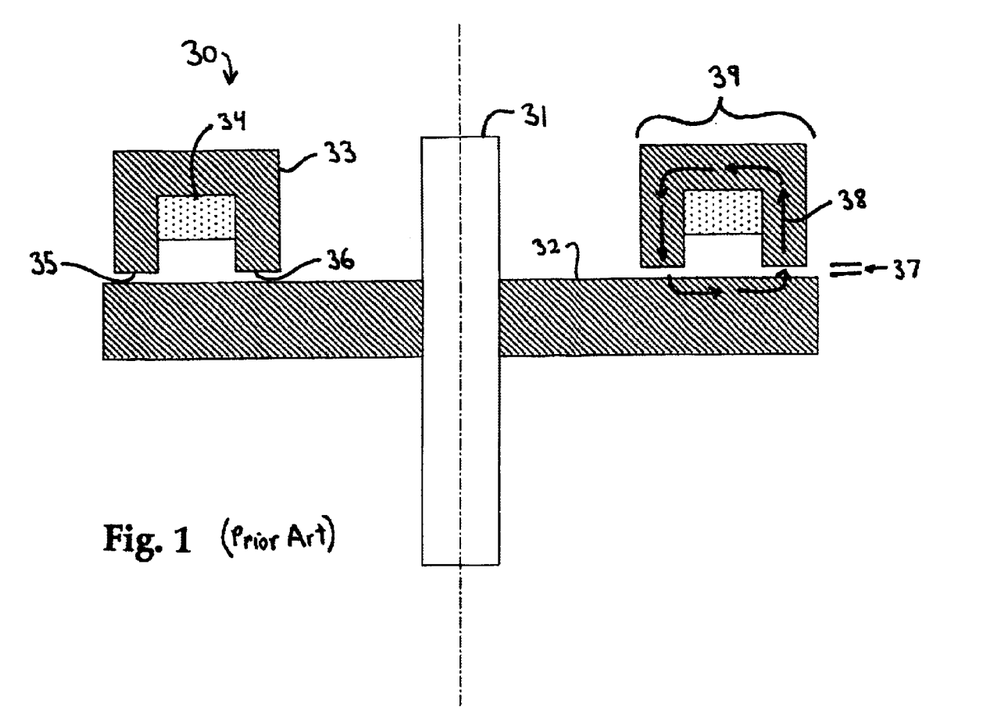
FIG. 1 is a schematic elevation of a prior art single sided active magnetic thrust bearing configuration using an unbiased electromagnet.

Unfortunately, the force to current response is nonlinear, which makes control of the magnetic bearing 30 difficult. The force generated is also small for the amount of current in the coil 34. Many turns of the coil 34 could be used to create a high intensity of flux 38 with minimal current, however this increases the inductance of the coil 34 and slows the response time, making it unsuitable for use in magnetic levitation bearings, This magnetic bearing 30 also generates a very high unstable tilting moment because a small change in the distance between the poles 35, 36 and the disk 32 causes a large change in the axial force. The magnetic bearing 30 also produces force only in the vertical direction. A positive current or negative current in the coil 34 both cause an upward force. To increase the force generation per control current and to make the response linear, a large bias current can be continuously run through the coil 34. The control current is then superposed on top of that current to provide a controllable force. The problem with this technique is that the magnetic bearing requires constant power consumption, and the unstable tilt moment generated is very large making full levitation systems more difficult with a nonlinear force-to-position response. Establishing a large bias flux through appreciable air gaps also requires a very large bias current and or number of coil turns.

Figure 2:
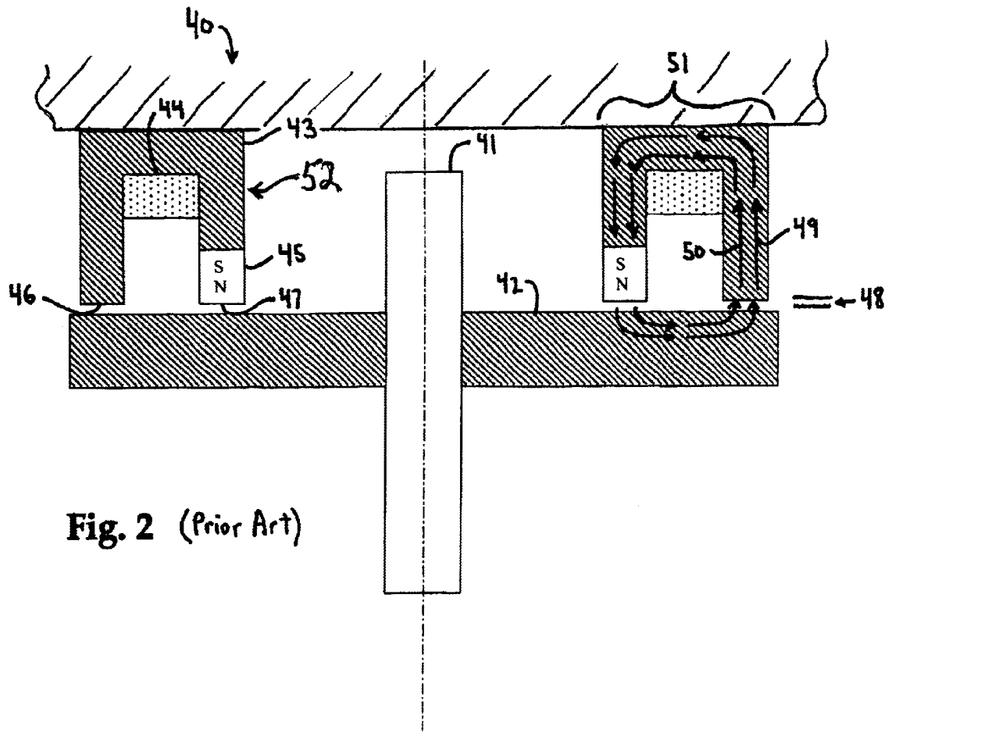
FIG. 2 is a schematic elevation of a prior art single sided active magnetic thrust bearing configuration using a permanent magnet in series with an electromagnet for generating bias flux.

A single sided active magnetic thrust bearing configuration using a permanent magnet in series with an electromagnet for generating bias flux of prior art is shown in FIG. 2. In this design, a permanent magnet is used to create the bias flux for the bearing. The active magnetic thrust bearing 40 is comprised of a thrust disk 42 attached to a shaft 41, and a cooperating ferromagnetic yoke 43 of an electromagnet 52 that is fastened to a fixed stator 51 and closely spaced from the disk 42. An electromagnetic coil 44 in the electromagnet 52, for generation of a control flux 49, is wound between inner and outer annular ring poles 46 and 47 of the yoke 43. A permanent magnet 45 generates a bias flux 50 without requiring electric power to the coil 44. The control and bias flux 49, 50 exit and enter the stator through the ring poles 46 and 47. The spacing between the thrust disk 42 and the poles 46, 47 of the yoke 43 constitute an axial air gap 48 between the fixed yoke 43 and the rotating thrust disc 42.

Although the permanent magnet 45 can generate a high bias flux 50 without requiring power and the flux can be established over larger air gaps 48, this design of magnetic bearing 40 has several deficiencies. The permanent magnet has a very low magnetic permeability, similar to an air gap. Therefore the control flux 49 created by the coil 44 must drive through a much larger effective air gap, so the amount of control flux generated per amount of coil current is significantly reduced. The force efficiency of the magnetic bearing is lower than desired. Also, operation with a control flux opposite in direction to the bias flux for causing a reduction in anal force can be difficult since the coil must work against the permanent magnet.

Other types of active magnetic thrust bearings that have linear response and efficient force generation have been developed. These thrust bearing use permanent magnets to generate a bias flux and electromagnetic coils to generate the control flux, However in these designs, the bearing is designed such that the coil need not drive the control flux through the permanent magnet. The control flux and the bias flux have non-coincident paths, but they share the portions of their paths including the axial air gaps where the fluxes add or subtract for highly amplified force generation. Because the control flux need not pass through the high reluctance permanent magnet, the amount of control flux per coil current is much greater. Several designs using this principal have been developed. Unfortunately, all such designs work by using two axial sides of the rotor and two or more axial surfaces. The control flux provides a highly efficient force response because the control flux adds with the bias flux on one axial side of the rotor and at the same time is subtracted from the bias flux on the opposite side. A reverse in the control current causes a reverse in the direction of the generated force. The problem with these magnetic bearings is that they require a complicated structure in which the stator must axially enclose a single thrust disk or the stator itself is enclosed by two or more disks. The multiple precision pieces are expensive and assembly and disassembly of machines using these bearings is difficult. The stator is essentially locked around the rotor when assembled. This can hinder magnetic bearing implementation in many applications.

Therefore, a need existed has long for a high force, high efficiency magnetic thrust bearing with a simple construction that can act in cooperation with a single axial side of a rotor.

SUMMARY OF THE INVENTION

Accordingly, this invention provides an active magnetic thrust bearing that acts in cooperation with only a single axial side of a rotor that is rotatable about an axis of rotation, while also having an efficient permanent magnet bias for linearized and highly amplified control. The active magnetic bearing uses two concentric ring poles that axially face a ferromagnetic axial surface of the rotor, creating two annular axial air gaps. A permanent magnet in the stator drives a bias flux through a first path including one ring pole, its air gap, the rotor, the second air gap and the second ring pole. The permanent magnet also drives flux through a second path in the stator, by-passing the rotor. The second path has a comparable reluctance to that level of flux produced by the permanent magnet.

An electromagnetic coil in the stator is wound coaxially with the axis of rotation. The coil drives a control flux in a circuit including the second path, both ring poles and axial air gaps. The bias and control fluxes are therefore superposed in the axial air gaps for amplified response. The force generated is proportional to the square of the flux density so a small control flux can result in a large change in axial force exerted upon the rotor. The use of the bias flux also makes this response linear. Because of the inclusion of the second path with reluctance comparable to the path including the a)al air gaps, the electromagnetic coil does not have to drive flux through the permanent magnet. A much higher control flux and higher force is generated from a given coil current and number of turns due to the presence of a lower reluctance circuit for the control flux The reluctance of the bias shunt circuit (the $2^{nd}$ Path) is high enough to prevent short-circuiting the bias flux In operation, the control flux either increases or decreases the total flux in the axial air gaps while simultaneously having the opposite effect in the second path. Compared with prior art designs using permanent magnet bias and non-coincident control and bias flux paths, the invention does result in lower force generation per coil current and number of turns. This is because the control flux path provided in the invention has a higher reluctance. However, because the invention can be made to operate on only a single side of the rotor, the construction is much simpler. The permanent bias and control flux path allows generation of much higher forces than previous single sided active magnetic thrust bearings and a linear response. In addition, larger magnets and or larger ring pole surface areas can also be used to further increase the force response. Employing a separate bearing on each of the opposite ends of a structure can also double the axial force on the structure. The bearings would be connected such that, as the force in one bearing is increased, the force in the other bearing is decreased. The second path can include a low permeability section to obtain a reluctance comparable to the path including the axial air gaps and rotor. In one embodiment of the invention, the second path has a shunt portion with a reduced cross sectional area. The reluctance would be very low at low levels of magnetic flux, but at the flux level provided by the permanent magnet, the small cross section area saturates and increases the reluctance in the shunt. The benefit of this configuration is simpler construction, allowing pieces to be fit together tightly and without the use of extra non-ferromagnetic spacers. The benefit of a comparable reluctance in the second path as the path that includes the axial air gaps is to prevent shorting of all of the bias flux from the permanent magnet through the second path, which would result in little or no bias flux traveling through the axial air gaps to the rotor and hence a small and nonlinear bearing force response.

In another configuration and embodiment of the invention, the permanent magnet can be attached to the rotor instead of the stator. This is usually less preferable because of the low strength of permanent magnets in combination with stresses generated during rotation, however, it may offer benefits in particular designs. The permanent magnet and the second path are located on the rotor and the coil is located on the stator as before for connection to electrical power.

The active magnetic thrust bearing is well suited for applications that experience anal force primarily in one direction, experience large axial forces, require simple assemble or disassembly (or both) and benefit from low cost simple construction. Applications include flywheel energy storage systems, turbines and pumps. In the application of flywheel Systems, the invention can work well with heavy flywheel systems such as those employing steel flywheels and especially in systems where the flywheel rotates about a substantially vertical axis. The invention allows generation of very large controllable axial forces for axially levitating a flywheel. The thrust bearing also generates a large passive upward force when located on a top-facing surface so that the bearing can be designed to lift the flywheel with very little control current. The magnetic bearing can also work directly on the axial face of a steel flywheel, which affords a large available surface area. Two sets of magnetic trust bearings can be used on opposite ends of the flywheel to double the force response to control current by one bearing decreasing its force when the force is increased at the other bearing. The bias flux creation from the permanent magnet reduces the unstable tilt moment generated from the thrust bearing and helps make a fill levitation magnetic bearing system more stable.

In another embodiment of the invention, the rotor can have matching pole rings that correspond with the stator pole rings. The two sets of rings magnetically tend to align, thereby producing a passive radial centering force. The invention can be employed in full levitation magnetic bearing systems using active radial magnetic bearings, passive radial magnetic bearings or in systems that use mechanical bearings for radial support.

DESCRIPTION OF THE PREFERRED EMBODIMENT

Figure 3:
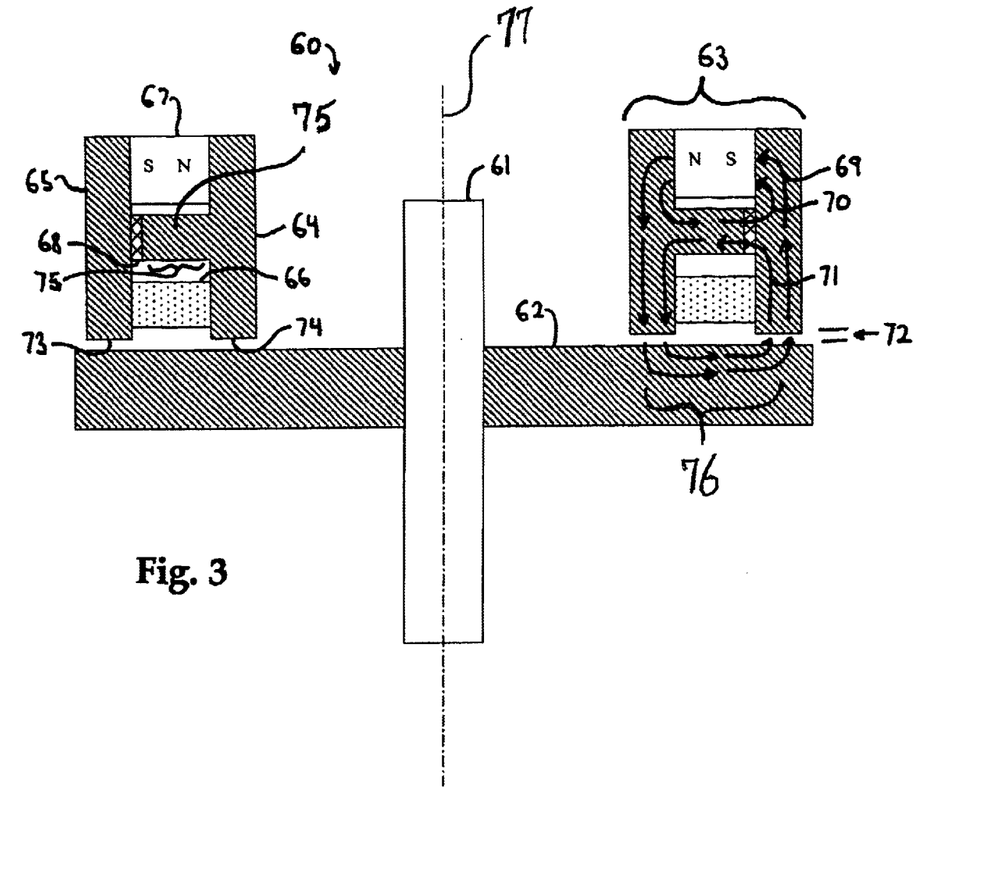
FIG. 3 is a schematic elevation drawing of a single sided active magnetic thrust bearing in accordance with the invention.

Turning to the drawings wherein like characters designate identical or corresponding parts, a single sided active magnetic thrust bearing 60 in accordance with the invention, shown in FIG. 3, includes a rotor or thrust disk 62 attached to a shaft 61 for rotation with the shaft 61 about an axis of rotation 77, shown in broken lines. The rotor 62 is magnetically attracted by an adjacent bearing stator 63, acting upon a single axial side of the disk 62. It is contemplated that a second stator could be implemented on the opposite side of the disk 62, and that the stators on opposite sides of the disc 62 would be magnetically independent. However, this construction would reduce the benefit of simpler construction and assembly and is less preferred.

The stator 63 is an annular body having two ferromagnetic yoke arms 64 and 65 that form concentric ring poles 74 and 73. The ring poles are axially spaced from the surface of the disc 62 by two annular, concentric air gaps 72 which together define an air gap plane that is perpendicular to the axis of rotation 77, although the air gap plane could be at a slight angle to the axis of rotation 77 or could be on an arc having a center of curvature at the center of the tilt axis of the rotor 62 to improve the tilt axis stability of the bearing. A radially magnetized ring magnet 67, or magnet pieces assembled into a ring, drives a magnetic bias flux through two toroidal paths 69 and 70.

A first flux path 69 for the permanent magnet 67, the bias flux path, includes the ring poles 73, 74, axial air gaps 72 and an annular portion 76 of the rotor 62 between the two ring poles 73, 74. A second flux path 70 for the permanent magnet 67, the bias shunt path, loops through a shunt section 75 of the stator 63. The shunt section 75 provides a flux conductor that is magnetically in parallel with the magnet 67 and the annular portion 76 of the rotor 62, and contains a high reluctance portion 68, which may be of non-ferromagnetic material or a portion that magnetically saturates at the flux intensity produced by the permanent magnet 67 through the shunt 75.

The reluctance of the first and send paths 69, 70 are preferably comparable for maximum force response of the magnetic bearing 60. For instance, it is preferable that the ratio of reluctances of the first and second paths 69, 70 be between 0.1 and 10. Ratios outside of this range can still achieve benefits of the invention but possibly not as large or as significant. The best ratio is really design dependent depending on the magnet dimensions and properties, desired axial air gaps, pole areas and coil current and number of turns. The maximum force is obtained by using a large magnet so that the bias flux through the axial air gaps can be made large even with a small reluctance in the second path. A small reluctance in the second path allows for generation of a higher control flux, which increases the force response, that is, the change in force exerted by the magnetic bearing resulting from a change in control current in the coil. Consideration of the pole areas must also be made to prevent saturation of the poles 73, 74.

An electromagnetic coil 66 in the stator 63 generates a control flux through a control flux path 71. The coil 66 is wound coaxial with the axis of rotation of the rotor 62. The control flux in control flux path 71 loops the coil 66 in a toriodal circuit that includes the ring poles 73, 74, axial air gaps 72, the annular portion 76 of the rotor 62 and the shunt 75. The control flux and bias flux share the ring poles 74, 73 and axial air gaps 72 but their paths are otherwise not coincident The shunt 75, although having a high reluctance portion 68, has a much lower reluctance than the permanent magnet 67, so a much higher control flux 71 is therefore generated by the control current applied to the coil 66 than would be generated if the shunt 75 did not exist. The reluctance of the shunt 75 and high reluctance portion 68 should not be made too low, which would increase the control flux but reduce the bias flux in the axial air gap 72 by shorting too much flux from the permanent magnet 67 through the shunt 75.

In operation, when a positive current is applied to the coil 66, the control flux 71 adds with the bias flux 69 in the air gap 72 between the ring poles 73, 74 and the rotor 62, thereby increasing the upward force exerted by the stator 63 on the rotor 62. When a negative current is applied, the control flux 71 is subtracted from the bias flux 69 and the upward force decreases. When the flux in the air gaps 72 increases, the superposition causes the flux in the parallel section to decrease. The force response of the magnetic bearing 60 is linear and highly amplified. The use of permanent magnets to provide the bias flux 69 results in reduced generation of an unstable tilt moment compared with bearings using electromagnetic generated bias flux This is because the permanent magnet 67 acts like a large air gap, and changes in the axial air gap 72 result in a relatively small change in the reluctance of the bias flux path 69 and hence a smaller change in the flux density and axial force from tilting.

Figure 4:
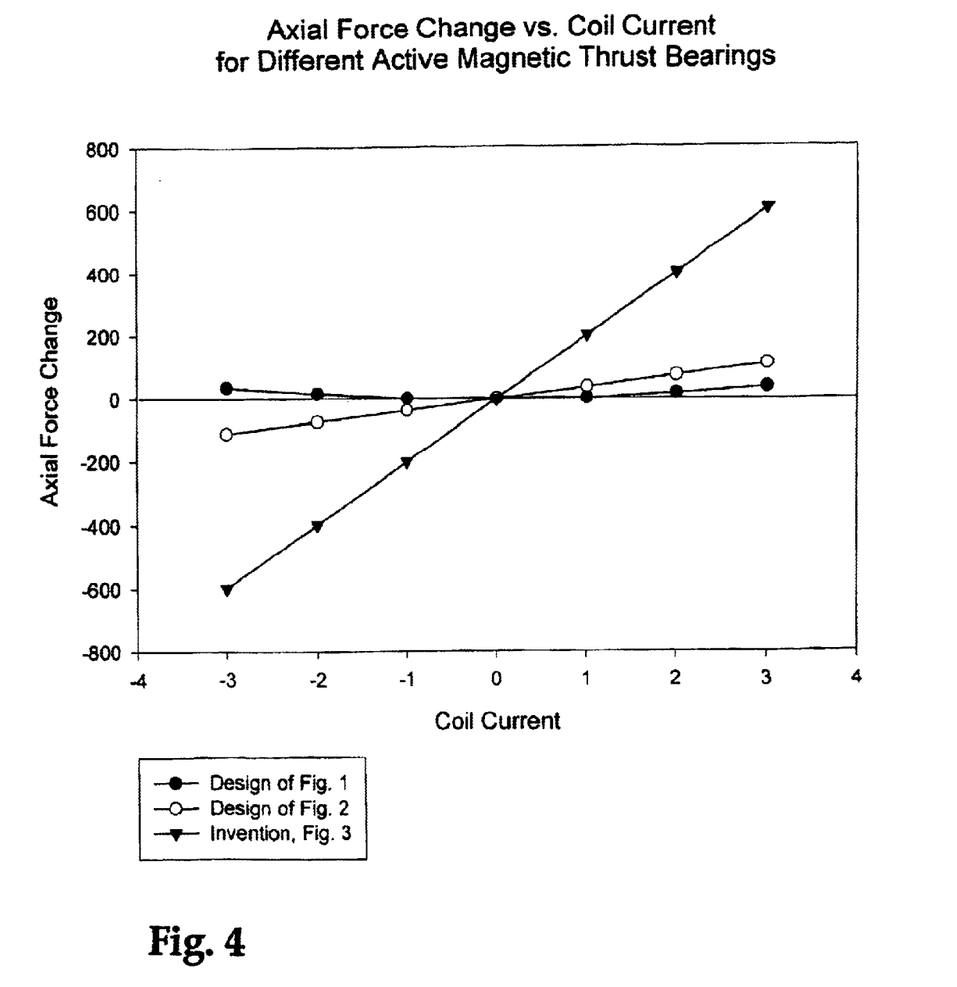
FIG. 4 is a graph showing a comparison of axial force to coil current for prior art single sided active magnetic thrust bearings and the invention.

A comparison of axial force generated to coil current for prior art single sided active magnetic thrust bearings and the invention, shown in the graph on FIG. 4, is based on a non-dimensionalized example for ease of comparison. For the design of FIG. 1, the coil current is varied from −3 to 3 resulting in a control flux from −3 to 3. The force generated is proportional to the square of the flux density and all designs in the comparison have the same pole area. The maximum axial force change for the design of FIG. 1 is only 36 and the force is positive for either positive or negative coil currents. The axial force change is nonlinear and is thus more difficult to control. For the design of FIG. 2, the permanent magnet provides a bias flux of 100. The coil current is again varied from −3 to 3. However, because the coil must drive flux through a higher reluctance magnetic circuit that includes the effective air gap of the magnet, the control flux generated per coil current is much less. For the example, the length of the magnet was assumed to be equal to 20 times the length of the 2 axial air gaps. Therefore, the control flux generated is equal to the coil current divided by 22. The axial force change from a coil current of −3 is −109 and is 109 for a coil current of 3. The response is linear, amplified over the design of FIG. 1 and negative coil currents cause a negative change in force. This result is much improved, but the force response is still smaller than desirable and required for many applications. The invention shown in FIG. 3 illustrates the dramatic performance improvement of the invention. The permanent magnet provides a bias flux of 100 and the air gap 68 in the second path was set equal to twice the axial air gap 72. The coil current is varied from −3 to 3, resulting in a control flux that varies from −3 to 3. For a coil current of −3, the axial force change is −598. A coil current of 3 provides a force change of 602. The response is linear, more highly amplified, and negative currents produce a reduction in force. The invention provides nearly six times as much force per coil current as prior art designs in this example. It should be noted that the static axial force with no coil current is 0 for design of FIG. 1 and 40,000 for the designs of FIGS. 2 and 3. The large static upward force can be used to offset the axial weight of a large vertically supported rotor or a rotor that experiences a large force in one direction. Alternatively, opposing bearings could be located on opposing ends of a body such that the static force becomes zero. With the coils of both active magnetic thrust be s wired in cooperation such that one decreases force when the other increases force, the anal force change would become double. A larger permanent magnet can also be used to increase the bias flux or alternatively allow for a lower reluctance shunt with the same bias flux The lower reluctance shunt 75 would increase the amount of control flux generated per coil current. Both would result in generation of even larger axial force changes per coil current, or force response.

The invention can be made with many different possible configurations. An alternate configuration single sided active magnetic thrust bearing 80 in accordance with the invention, shown in FIG. 5, includes a ferromagnetic rotor 82 attached to a shaft 81 and an adjacent stator 83 that generates an attractive axial force on the rotor 82. The stator 83 is an annular structure having two annular, radially spaced, concentric ferromagnetic yokes 84 and 85 that form axial ring poles 90 and 89 facing the axially facing surface of the rotor 82. An axial air gap 91 is formed there between. A radially magnetized permanent ring magnet 87, preferably a rare earth permanent magnet such as NdFeB capable of producing a high flux density, is positioned between the yokes 84 and 85 and generates bias flux that travels in two torodial paths 92 and 93. The bias flux path 92 travels through the pole rings 90, 89, axial air gaps 91 and an annular ferromagnetic region 96 of the rotor 82. The second path 93 loops around the magnet 87 and through a shunt 95 that has a portion 88 with higher reluctance. The high reluctance portion 88 is formed by simply having a portion with reduced cross sectional area in the second path. The reluctance is low for low flux levels but at the flux level generated by the permanent magnet 87, the reduced area section 88 saturates and becomes high reluctance.

Figure 5:
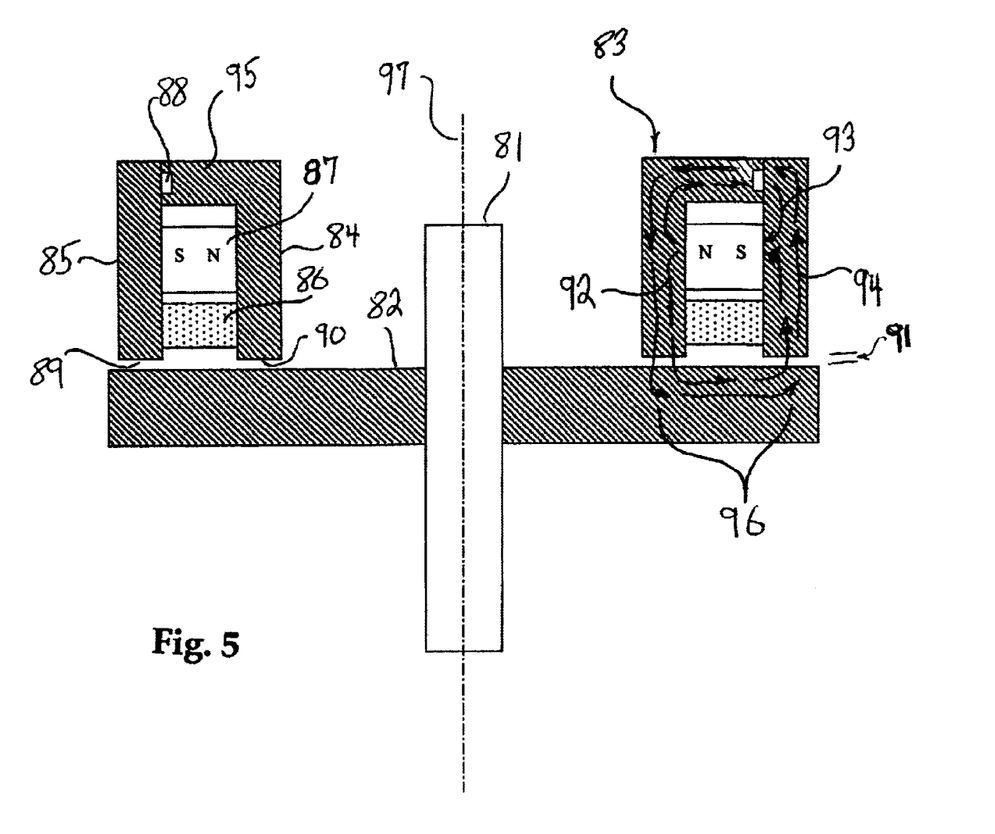
FIG. 5 is a schematic elevation drawing of an alternate configuration single sided active magnetic thrust bearing in accordance with the invention.

The inner and outer yokes 84, 85 can be interference assembled for good concentricity and no extra non-ferromagnetic spacer is required. The benefit of using this structure is simpler construction. It is also possible, in another embodiment, that both yokes 84, 85 are fabricated as a single piece and the high reluctance portion machined into the combined yoke. This would result in even simpler construction and less assembly. A control coil 86 is disposed between the ring poles 89, 90 and is wound coaxially with the axis of rotation 97 of the rotor 82. The coil 86 produces a control flux that loops the coil 86 in a control flux path 94 that includes the two yokes 84, 85, the air gaps 91 and the annular ferromagnetic region 96 in the rotor 82, and by-passes the magnet 87 by flowing through the shunt 95. The coil 86 could be placed outside of the poles 89, 90, but this would result in less control flux in the path 94 and is not preferred. The control flux in the path 94 is superposed with the bias flux in the path 92 in the axial air gaps, creating an amplified and linear force response.

The previous two configurations of the invention used radially magnetized permanent magnets. This type of ring magnet is more expensive and difficulties can arise in getting the field to be uniform, so there are benefits to using axially magnetized magnets. Accordingly, a second alternate configuration single sided active magnetic thrust bearing 100 in accordance with the invention, shown in FIG. 6, uses an axially magnetized ring magnet 107. One of the benefits of the invention acting on only a single axial side of a rotor is that the use of an attached thrust disk may not be required. The configuration shown in FIG. 6 has a stator 103 acting on the axial end of a rotor body 102 only. The active magnetic thrust bearing 100 includes the rotor 102 and a fixed stator 103. The rotor 102 is shown with an integral shaft 101. The stator 103 is an annular structure having two concentric ferromagnetic yokes 104 and 105 that form concentric ring poles 109 and 110. Rotors without a shaft 101 could have the inner pole ring 110 consolidated into a solid cylinder, which could be considered a ring with an inner diameter of zero.

Figure 6:
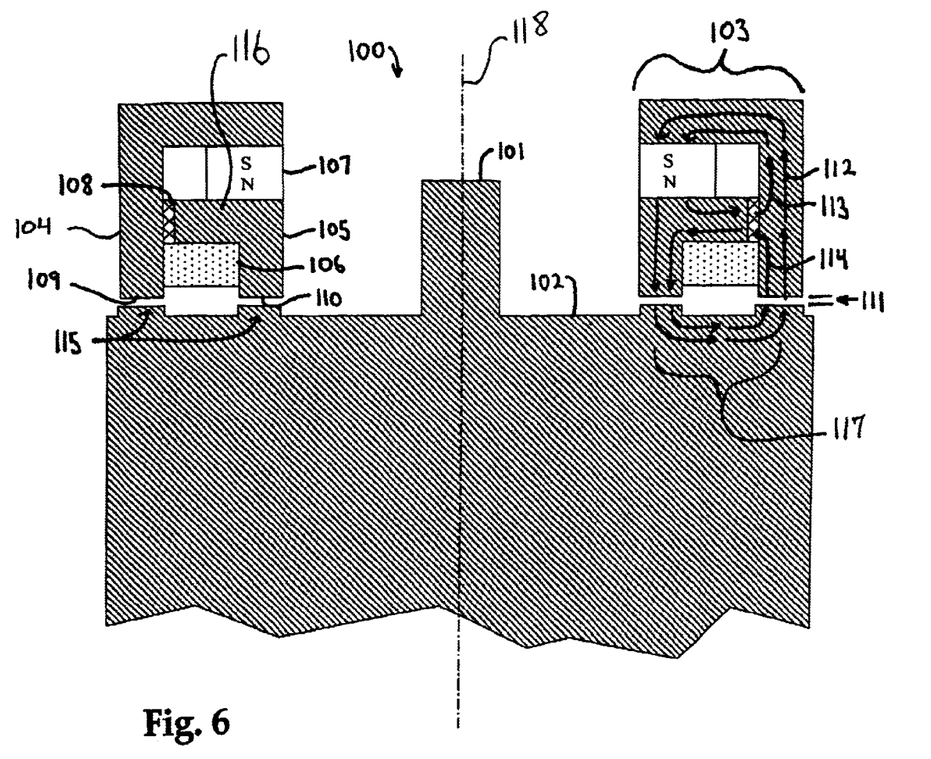
FIG. 6 is a schematic elevation drawing of a second alternate configuration single sided active magnetic thrust bearing in accordance with the invention.

The area of the poles 109 and 110 should be chosen to provide the desired force response. The force generated is proportion to the flux density, so smaller pole areas can yield high axial forces per coil current. However, consideration must be taken to prevent saturation of the poles 109, 110 before reaching the maximum desired force capability because of cross sectional pole areas that are too small. An axially magnetized ring magnet 107, or ring magnet assembly made of separate magnet segments, provides bias fluxes 112 and 113. The bias flux 112 travels through the ring poles 109, 110, across the air gaps 111 and through an annular ferromagnetic region of 117 the rotor 102. The axial face of the rotor 102 has matching axially projecting pole rings 115 that are magnetically biased to align with the stator poles 109 and 110. The result of the rotor poles 115 is that the stator 103 generates a passive radial centering force on the rotor 102. The single sided active magnetic thrust bearing of the invention thereby also becomes a passive radial magnetic bearing.

The permanent magnet 107 also drives flux through a second path 113 that includes a shunt 116 that incorporates a high reluctance portion 108 or an air gap. The control coil 106 is disposed between the poles 109, 110 and is wound coaxial with the axis of rotation 118 of the rotor 102. The control flux travels through a control flux path 114 that includes the shunt 116 and its high reluctance portion 108, through both stator poles 109, 110, axial air gaps 111 and through annular region 117 of the rotor 102. As before, superposition of the control and bias fluxes in the axial air gaps 111 produces a high force response.

Figure 7:
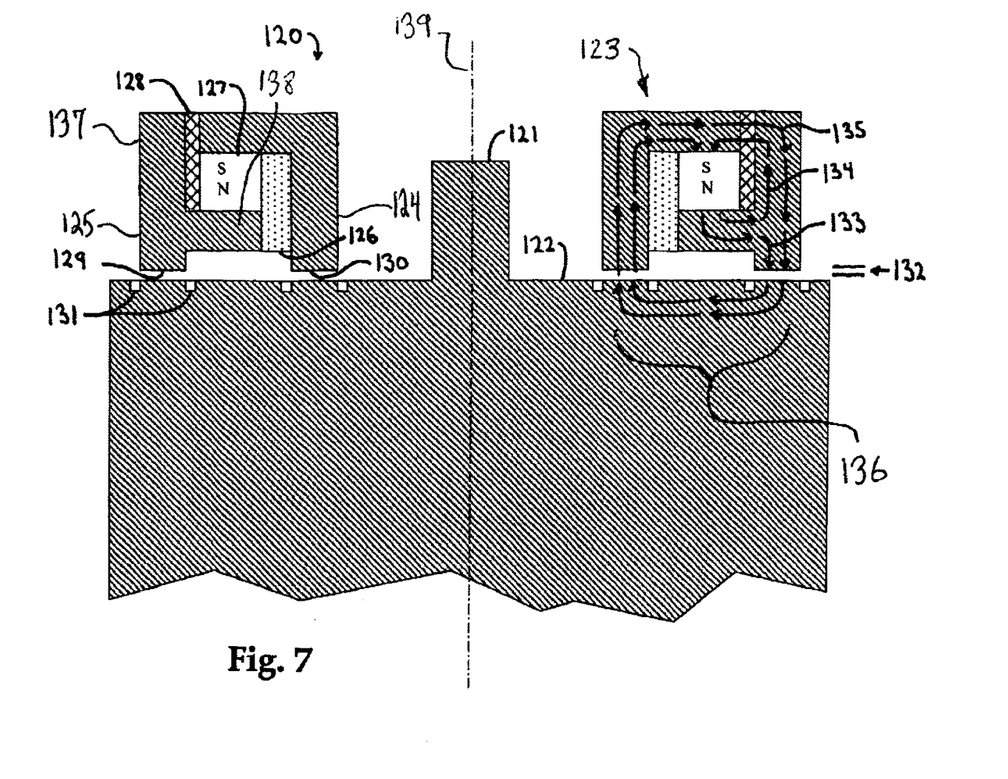
FIG. 7 is a schematic elevation drawing of a third alternate configuration single sided active magnetic thrust bearing in accordance with the invention.

A third alternate configuration single sided active magnetic thrust bearing 120 in accordance with the invention, shown in FIG. 7, has different construction from the previous configuration, but has similar functioning. The active magnetic thrust bearing 120 has a rotor 122 with an integral shaft 121, and a stator 123 that provides controlled axial levitation force on the rotor 122. The stator 123 is an annular structure having two radially spaced apart annular yokes 124 and 125 that form pole rings 129 and 130 facing the axial surface of the rotor 122 and axially spaced from the axial surface of the rotor by axial air gaps 132. An axially magnetized ring magnet 127 provides bias flux, which loops through two toroidal paths 133 and 134. The bias flux in the path 133 traverses a stator arm 138, the two poles 129, 130 and the axial air gaps 132, and travels through an annular region 136 in the rotor 122. The shunted bias flux loops in the bias shunt path 134 around the magnet 127, passing through a shunt 137 having a high reluctance portion 128 that prevents shorting of all of the bias flux from the magnet 127. An electromagnetic coil 126 is wound coaxially with the axis of rotation 139 of the rotor 122. The coil 126 generates a control flux 135 that is superposed with the bias flux 133 in the axial air gaps 132. In this configuration, the rotor 122 contains poles that are formed by cutting grooves 131 into the axial face of the rotor to offer some radial centering force for the magnetic bearing 120.

Figure 8:
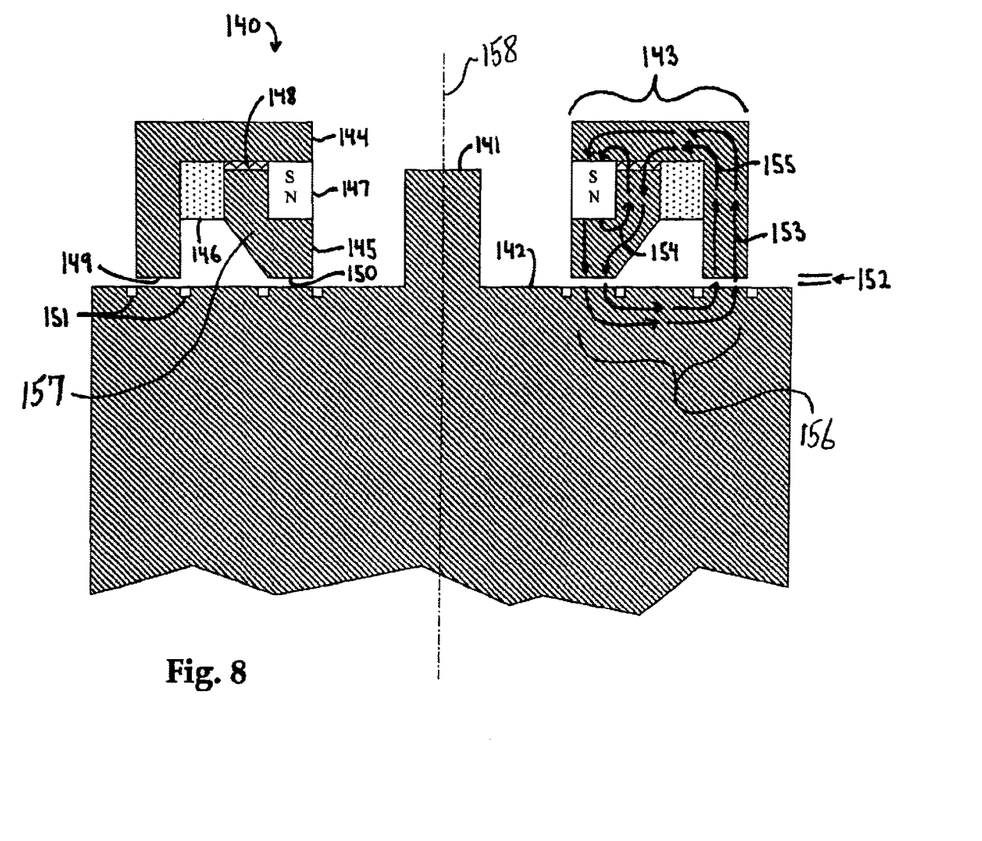
FIG. 8 is a schematic elevation drawing of a fourth alternate configuration single sided active magnetic thrust bearing in accordance with the invention.

A fourth alternate configuration single sided active magnetic thrust bearing 140 in accordance with the invention, shown in FIG. 8, may offer easier assembly for some systems. The active magnetic thrust bearing 140 includes a rotor 142 with an integral shaft 141 and a fixed annular stator 143 that is axially adjacent to the rotor 142. The stator 143 has two yokes 144 and 145 that form axial pole rings 149 and 150, closely space from the surface of the rotor by an axial air gap 152. A permanent magnet 147 creates bias flux that travels in two toroidal paths 153 and 154. The bias flux 153 travels through the stator poles 149, 150, the axial air gaps 152 and through an annular region 156 in the rotor 142. The bias shunt flux 154 loops around the magnet 147 and passes through a shunt 157 having a high reluctance portion 148. A control coil 146, wound coaxially with the axis of rotation 158 of the rotor 142, generates control flux, which loops the coil 146 in a toriodal path 155 including portions of the yoke 144, the shunt 157 and its high reluctance portion 148, both poles 149, 150 and the air gaps 152, and the annular region 156 of the rotor 142. The control flux and bias flux 155 and 153 superpose in the axial air gaps 152 to provide actively controllable thrust force. Grooves 151 in the face of the rotor 142 provide passive radial centering. It is also possible to increase the amount of passive radial centering force generated by dividing each of the stator poles 149, 150 into multiple poles and having multiple poles on the poles on the face of the rotor 142.

It is usually most desirable to place permanent magnets in magnetic bearing applications on stationary parts. Magnets typically have low strength and can fracture if subjected to stresses of high speed rotation. Up to this point, all configurations of the invention have had the permanent magnet for generation of bias flux located on the stator. However, the invention can also be configured such that the permanent magnet is located on the rotor. There may be some circumstances where this is preferable, possibly due to space requirements for a certain application. It is also contemplated that magnetic bearings according to the invention could have permanent magnets on both the rotor and stator for generation of even higher bias fluxes and force response. The rotor and stator in this case would each have second paths.

The invention is well suited for applications that require high axial force generation, high forces primarily in one direction and or easy assembly and disassembly. Such applications can include but are not limited to flywheel energy storage systems, turbines, engines and pumps. The invention is particularly useful in flywheel energy storage systems. Flywheels can have very large masses for storing large amounts of energy. This is especially true for flywheels constructed of steel. When a flywheel is designed to rotate about a vertical axis, the high axial force response of the active magnetic thrust bearing can be used to control the axial position. The large static, or zero current, axial upward force provided by the single sided construction of the invention can be designed to support the majority of the flywheel weight without coil current. The magnetic thrust bearing can also actuate directly on the axial end of the rotor that can have a large surface area. Alternatively, upper and lower axial magnetic thrust bearings can be placed on both ends of the rotor for double the force response.

Figure 9:
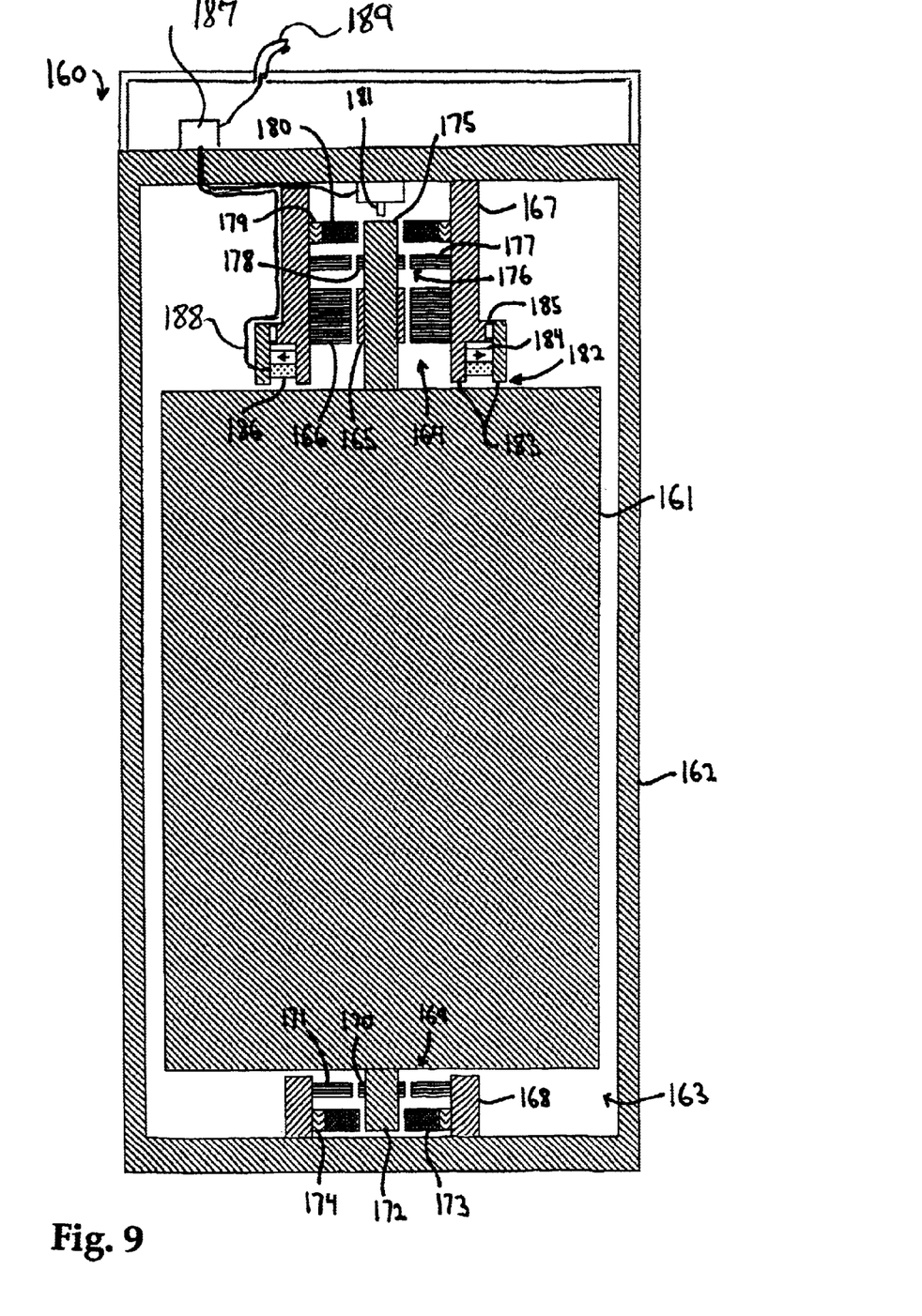
FIG. 9 is a schematic elevation drawing of a flywheel energy storage system with a single sided active magnetic thrust bearing in accordance with the invention.

As shown in FIG. 9, a flywheel energy storage system 160 with single sided active magnetic thrust bearing in accordance with the invention includes a solid steel flywheel 161 that rotates in an evacuated chamber 163 inside a sealed container 162. The flywheel 161 has upper and lower axial shafts 175 and 172 having axes lying on the axis of rotation of the flywheel 161. The flywheel 162 is supported by a full levitation magnetic bearing system that includes upper and lower active radial magnetic bearings 176 and 169, and an active magnetic thrust bearing 182. The radial magnetic bearings 169, 176 have bearing rotors 170 and 178 that are attached to the shafts 172, 175. The rotors 170, 178 are surrounded by and acted upon by radial bearing stators 171 and 177.

The axial weight of the flywheel 161 is supported by the active magnetic thrust bearing 182. The thrust bearing has two concentric axial ring poles 183 that act magnetically upon the top axial end of the flywheel 161. A permanent magnet 184 drives bias flux in a toroidal first path, including the poles 183 and an annular region of the rotor 169 between the two ring poles 183, and also drives flux in a toroidal second path through a shunt 185 that is magnetically in parallel with the magnet 184 and the annular region of the flywheel 161 between the poles 183. The shunt 185 has a high reluctance portion that is comparable to the reluctance of the first path A coil 186, wound coaxially with the axis of rotation of the flywheel 161, provides control flux which loops the coil 186 in a toroidal path including the two ring poles 183, the shunt 185, and the annular region of the flywheel 161 between the two poles 183. An axial position sensor 181 senses the position of the shaft 175 provides position feedback data to a controller 187, which sends control current via a conductor 188 to the coil 186 to maintain levitation of the flywheel 161. The power for the control current could be supplied from the electric grid via an external cable 189, which also supplies power to a motor/generator 164 for accelerating the flywheel, and conducts power from the motor/generator when needed. A velocity sensor could be used instead of the position sensor 181, or the coil 186 itself could be used to provide the feedback for control. When the magnetic bearings 182, 176, 169 are not operating, auxiliary bearings 173 and 180 support the flywheel 161. The bearings 173, 180 are mounted to upper and lower housings 167 and 168 through use of spring dampers 174 and 179. To store and retrieve energy, the motor/generator 164 attached to the shaft 175 provides torque to accelerate the flywheel to its operating rotational speed. The motor/generator 164 has a permanent magnet motor rotor 165 attached to the shaft 175 and a surrounding stator 166. Other types of motor/generators or a separate motor and generator can also be used.

Figure 10:
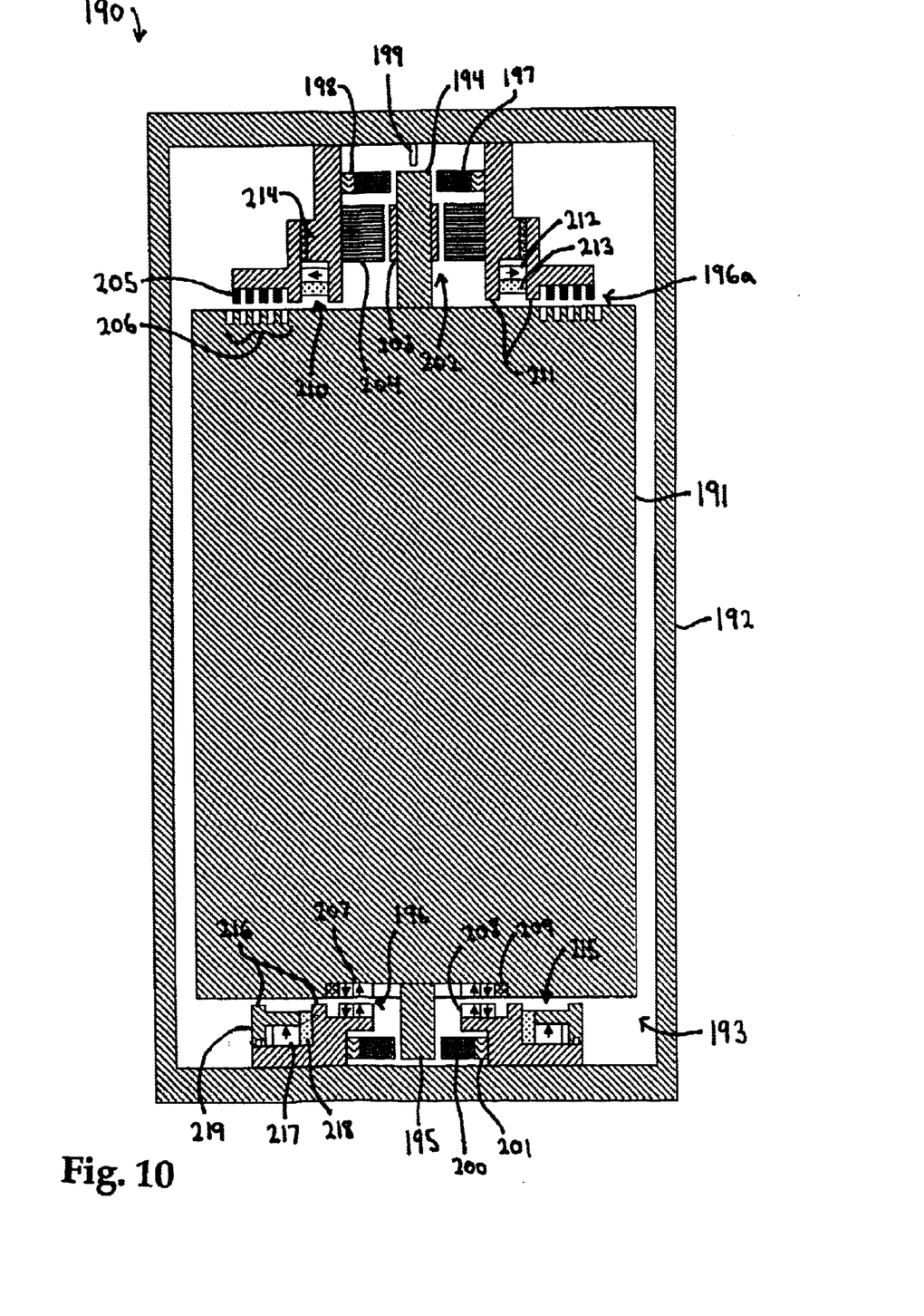
FIG. 10 is a schematic elevation drawing of an alternate configuration flywheel energy storage system with single sided active magnetic thrust bearing in accordance with the invention.

Another configuration of a flywheel energy storage system 190 with a single sided active magnetic thrust hearing in accordance with the invention, shown in FIG. 10, has a solid steel flywheel 191 that rotates inside a container 192 having an internal chamber 193 maintained at a vacuum. The flywheel 191 has upper and lower shafts 194 and 195 and is supported by a full levitation magnetic bearing system. In this configuration, the flywheel is supported radially by passive radial magnetic bearings 196 and 196a and is supported axially by upper and lower active magnetic thrust bearings 210 and 215. Two different types of passive radial magnetic bearings 196, 196a are illustrated. The passive radial magnetic bearing 196a is comprised of multiple stationary concentric permanent ring magnets 205 and cooperating concentric ring poles 206 on the upper axial face of the flywheel 191. The ring poles 206 and ring magnets 205 are co-axial with the longitudinal aids of the flywheel and the ring poles 206 tend to align with the ring magnets 205 and generate a passive radial centering force tending to hold the flywheel radially on its longitudinal axis. The passive radial magnetic bearing 196 uses ring magnets 207 attached to the face of the flywheel 191 that tend to align with stationary bearing ring magnets 208. A magnetically insulating ring 209 is included to prevent shorting of the magnets 207.

In this example, active axial magnetic thrust bearings 210, 215 are used at both the top and bottom ends of the flywheel 191, providing twice the axial control force that would be provided by such a bearing at only one end. The upper thrust bearing 210 is like the embodiment shown in FIG. 5, and the lower thrust bearing 215 is like the bearing shown in FIG. 7. The thrust bearings 210, 215 have permanent magnets 212, 217 for providing bias flux and control coils 213, 218 for generating control flux. The shunts 214 and 219 complete a magnetic circuit for the control flux from the coils 213 and 218, while high reluctance portions in the shunts 214, 219 prevent shorting of the magnets 212, 217. Axial ring poles 211, 216 cooperate with the faces of the flywheel 191. The trust bearings 196, 196a could use disks attached to the flywheel shafts 194, 195 instead of using the ferromagnetic properties of the flywheel itself, or for use with composite flywheels, however this would be more complex and bulkier in this design An axial position sensor 199 provides feedback, as in the system shown in FIG. 9. When the magnetic thrust bearings 196, 196a are not operating, the flywheel is supported by auxiliary bearings 197, 200 that are mounted using compliant mounts 198 and 201. The flywheel 191 is accelerated and decelerated for storing and retrieving energy using a motor/generator 202. The motor/generator 202 is comprised of a rotor 203 attached to the shaft 194 that is surrounded by a stator 204. An axial gap motor/generator could also be used which would have the benefit of generating lower or no radial destabilizing forces.

The active magnetic thrust bearing can also be used in combination with mechanical bearings. A second alternate configuration flywheel energy storage system 230 with single sided active magnetic thrust bearing in accordance with the invention, shown in FIG. 11, has a flywheel 231 that rotates inside an evacuated chamber 233 within a sealed container 232. The flywheel 231 is supported radially by upper and lower mechanical bearings 236 and 238 such as ball bearing sets. The mechanical bearings 236, 238 are mounted to upper and lower housings 248 and 249 using compliant mounts 237 and 239. The life of the mechanical bearings 236, 238 is greatly extended by removing most or all of the anal weight of the flywheel 231. To remove all of the weight, the shafts 235 and 234 can be axially free inside the bearings 236, 238.

Figure 11:
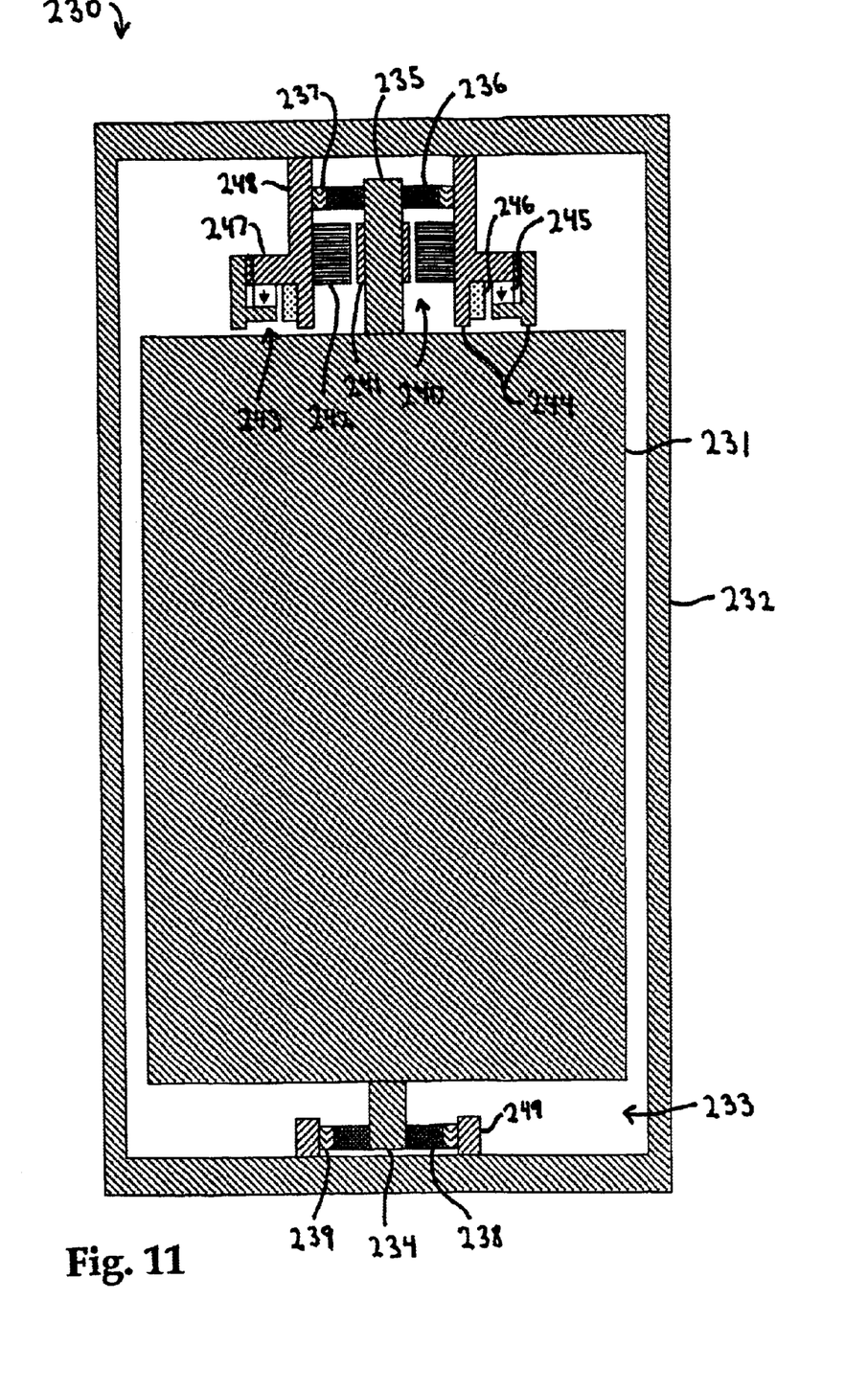
FIG. 11 is a schematic elevation drawing of a second alternate configuration flywheel energy storage system with single sided active magnetic thrust bearing in accordance with the invention.

An active magnetic thrust bearing 243 lifts the weight of the flywheel 231. The thrust bearing has a permanent magnet 245 to provide bias flux and an electromagnetic coil 246 that provides control flux A shunt 247 having a high reluctance portion completes the magnetic circuit that loops the coil 246 through concentric ring poles 244 and across air gaps to an annular portion of the axially facing surface of the flywheel 231 between the ring poles 244 to provide lift. The high reluctance portion of the shunt 247 prevents shorting of all the bias flux from the magnet 245. A position sensor, like that shown at 181 in FIG. 9, can be used for feedback if the flywheel 231 is axially free in the mechanical bearings 236, 238. Alternatively, if the thrust bearing 243 is used to remove only a majority of the axial weight of the flywheel 231 from the mechanical bearings 236, 238, a load cell, not shown, or constant current supply can control the thrust bearing. The flywheel is accelerated and decelerated for storing and retrieving energy through an attached motor/generator 240. The motor/generator 240 uses a rotor 241 attached to the flywheel shaft 235 that is surrounded by and acted upon by a stator 242.

Figure 12:
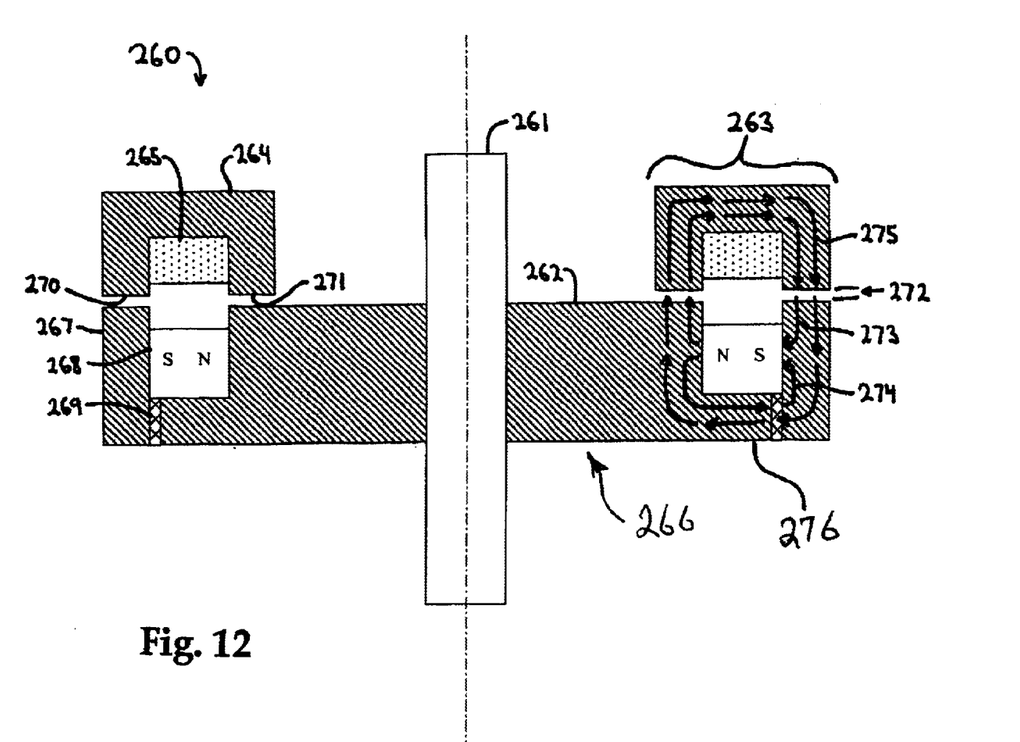
FIG. 12 is a schematic elevation drawing of a fifth alternate configuration single sided active magnetic thrust bearing in accordance with the invention.

A fifth alternate configuration single sided active magnetic thrust bearing 260 with permanent magnet on a rotor 266 in accordance with the invention, shown in FIG. 12, includes a disk 262 attached to a shaft 261 and acted upon by a stator 263. The stator 263 has an annular downwardly opening U-shaped ferromagnetic yoke 264 having two radially spaced concentric poles 270 and 271, and receives an electromagnetic coil 265, wound coaxial with the axis of rotation of the disk 262. The poles 270 and 270 are closely spaced axially from the surface of the rotor 266, defining therewith two concentric axial air gaps 272. The rotor 266 includes the disk 262 and an outer ferromagnetic ring 267. A permanent magnet 268, attached in a recess in the rotor 266, provides bias flux, which travels in first and second toroidal paths 273 and 274. The bias flux first path 273 traverses the axial air gaps 272 and through the yoke 264. The pole rings 270 and 271 receive and send the flux across the air gaps 272 between the rotor 266 and stator 263. The magnet 268 also generates another flux 274 that loops around the magnet and traverses the bias shunt path through a shunt 276 which includes a high reluctance spacer 269 in the shunt 276. The outer ring 267 can be interference assembled over the magnet 268 to reinforce it for high speed rotation. The coil 265 generates the control flux 275, which superposes with the bias flux 273 in the axial air gaps 272 and produces a high force response.

In all configurations of the invention, the result is to produce a high axial force with linear response and a single sided construction. It is conceivable that the axial air gaps could be put on slight angles by angling the axial surfaces of the yoke poles and the rotor surface. This would result in generation of some radial unstable force and a reduction in the axial force generated. Such a modification is not preferable but it would still produce the linear amplified axial force of the invention and would be considered to be in accordance with the invention.

Obviously, numerous modifications and variations of the preferred embodiment described above are possible and will become apparent to those skilled in the art in light of this specification. For example, the yoke could have only a single annular pole forming a single annular axial air gap with the rotor, with the other pole forming an airgap with the rotor shaft and completing the flux path through the rotor shaft. Moreover, many functions and advantages are described for the preferred embodiment, but in many uses of the invention, not all of these functions and advantages would be needed. Therefore, I contemplate the use of the invention using fewer than the complete set of noted features, process steps, benefits, functions and advantages. For example, all the process elements may be used to produce a particular product or output that requires the characteristics provided by each process element, or alternatively, they may be used in combinations that omit particular process elements or substitute others to give the desired characteristics. Moreover, several species and embodiments of the invention are disclosed herein, but not all are specifically claimed, although all are covered by generic claims. Nevertheless, it is my intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, in all their combinations, are to be considered within the spirit and scope of the invention as defined in the following claims, wherein.

I claim:

1. A magnetic bearing for producing an axially attractive force to support a rotating body, comprising:
   a rotor having an axially-facing surface supported for rotation about an axis of rotation; and a stator, axially separated from said rotor surface by an air gap, and magnetically supporting said rotor axially;
   said stator having an annular electromagnetic coil attached thereto, and an annular ferromagnetic body having two radially spaced-apart concentric ring poles spaced apart from said rotor surface and defining therewith two annular axial air gaps on a single axial side of said rotor,
   an annular ferromagnetic region axially aligned with said stator poles that cooperates magnetically with said stator to produce said attractive force of said bearing;
   a permanent magnet in said stator for producing a bias flux through firs and second bias flux paths; said first path including portions of both of said ring poles, both of said axial air gaps and said annular ferromagnetic region of said rotor, said second path including a shunt that is magnetically in parallel with said annular ferromagnetic region of said rotor and bypass said axial air gaps;
   said second path having a reluctance to said flux from said permanent magnet that is comparable with magnetic reluctance of said first path;
   said electromagnetic coil lies between said ring poles of said stator and has an axis that is oriented co-axially with said axis of rotation and, said coil having leads for connection to a source of electrical power and, when energized by said electrical power, provides a control flux through both air gaps and around said permanent magnet through said shunt.

2. A magnetic bearing as defined in claim 1, further comprising:
   multiple poles through which flux passes in each direction between said rotor and stator.

3. A magnetic bearing as defined in claim 1, further comprising:
   a plurality of second paths.

4. A magnetic bearing as defined claim 1, wherein:
   said inner ring pole is a solid cylinder.

5. A magnetic bearing as defined in claim 1, further comprising:
   a permanent magnet ring on said rotor.

6. A magnetic bearing as defined in claim 1, wherein:
   said rotor and said stator both have permanent magnet rings axially facing each other.

7. A magnetic bearing as defined in claim 1, wherein:
   said magnet is axially polarized.

8. A magnetic bearing as defined in claim 1, wherein:
   said magnet is radially polarized.

9. A magnetic bearing as defined in claim 1, wherein:
   said rotor is a steel flywheel and said stator acts directly on an axial end of said steel flywheel.

10. A magnetic bearing as defined in claim 9, wherein:
    said flywheel and said stator constitute the entire magnetic support for said flywheel;
    whereby, said flywheel is free of any attached thrust disc used by said magnetic bearing.

11. A magnetic bearing as defined in claim 1, wherein:
    said shunt has a high reluctance portion.

12. A magnetic bearing as defined in claim 1, wherein:
    said reluctance in said shunt becomes high reluctance only after magnetic saturation by said permanent magnet.

13. A magnetic bearing as defined in claim 1, further comprising:
    poles on said rotor axially aligned with said stator poles to provide passive magnetic radial centering.

14. A magnetic bearing as defined in claim 1, wherein:
    two of said magnetic bearings are mounted to a fixed support on opposite facing ends of said flywheel.

15. A magnetic bearing as defined in claim 1, wherein:
    said axial air gaps define a plane that is exactly perpendicular to said axis of rotation.

16. A process for suspending a large flywheel for high-speed rotation about a vertical axis, comprising:
    producing a bias flux with a permanent magnet, and conducting said bias flux through first and second bias flux paths;
    said first path including portions of two radially spaced concentric ring poles, both of said axial air gaps, and an annular ferromagnetic region of said rotor between said poles;
    said second path including a shunt that is magnetically in parallel with said annular ferromagnetic region of said rotor and bypasses said axial air gaps;
    said second path having a reluctance to said flux from said permanent magnet that is comparable with magnetic reluctance of said first path;
    producing a control flux in an electromagnetic coil, and conducting said control flux through both air gaps and around said permanent magnet through said shunt; and
    modulating said control flux with a control system based on inputs from a position sensor to levitate said flywheel.

* * * * *